Patented Apr. 3, 1945

2,372,986

UNITED STATES PATENT OFFICE 2,372,986

MANUFACTURE OF CASEIN

Luzius Schibler, Basel, Switzerland, assignor to Society of Chemical Industry in Basle, Basel, Switzerland, a Swiss firm No Drawing. Application March 9, 1943, Serial No. 478,571. In Switzerland March 30, 1942

8 Claims. (Cl. 260—120)

The present invention is concerned with a process for the purification of technical casein and has for its main object the manufacture of pure, specially albumin-free solution of technical acid precipitated casein, from which pure casein may be obtained, if desired, in a simple manner.

Casein, which is prepared on a large scale by the acidification of skim milk by various processes, always contains certain quantities of extraneous matter. Apart from traces of salts, lactose, fat, etc., this consists mainly of protein substances such as globulin and albumin. The former is also only present in traces, the latter, on the other hand, in quantities up to 15%.

Casein preparations are known, it is true, in which the content of foreign protein substances, fats, salts etc. is reduced to a minimum by the use of suitable methods of precipitation and purification. These processes are, however, partly very complicated, are not very suitable for the technical manufacture of casein, and do not guarantee such a degree of purification as the present process. The latter makes possible the preparation on a technical scale of products which are characterized by the special transparency and viscosity of their solutions and which are not inferior in their colloidal properties (such as protective effect, gold and ruby values, emulsifying power etc.) to the best of the casein preparations already known.

The invention upon which the present process is based, consists of emulsifying in a solution of technical acid precipitated casein which contains a hydrotropic substance, one or more solvents, which are immiscible or only partly miscible with water and whose specific gravities both separately and as a mixture differ from the specific gravity of the casein solution, and the emulsion allowed to stand until the part of the organic solvent which is insoluble in water has sharply separated from the clear aqueous layer formed by the casein solution, i. e. complete separation of the emulsion has set in. Surprisingly enough the finely distributed impurities are carried over quantitatively by said organic solvent and can easily be separated, together with the organic solvent, by decantation. The organic solvents can best be regained from the mucilaginous mass by distillation with or without steam; the residual lactalbumin may be isolated by known methods. The clear casein solution which may have separated off as to the lower upper layer, according to the conditions existing, generally has a yellowish coloration, is completely transparent and contains practically no more flocculate. The casein which can be obtained from the solution by known methods contains no more albumin and is also practically free from fat.

Neuberg (Biochem. Zeitschr. 76 [1916], page 107) defines hydrotropic substances as substances which possess the peculiar ability of bringing substances which are insoluble in water into aqueous solution. Certain easily soluble, neutral substances exhibit very pronounced hydrotropism in relation to proteins; such substances are sodium benzoate, sodium cymene sulphonate, urea, thiourea, biuret, dicyandiamide, ammonium thiocyanate, potassium iodide, triethanolamine borate, foramide, acetamide etc. Aqueous solutions of these substances are capable of dissolving casein in considerable quantities, even without the addition of alkaline decomposing agents.

This hydrotropic effect, however, seems not to extend to the foreign proteins such as lactalbumin. Such substances cause a turbidity of the casein solutions even in the presence of hydrotropic substances, and even separate out in easily visible, mucilaginous flocks. This phenomenon, which generally occurs after some time only, is known.

The albuminous flocculate has also already been separated off by dilution of the solution and filtration. It is known, however, that the filtration of colloidal solutions is connected with considerable difficulties, and complete separation of the flocculate is probably not possible in this manner. For example, visible coagulation and separation of the albumin from casein solutions containing urea often require one to two months, whereas the present process makes possible a practically quantitative separation within 24 or 48 hours.

Comparatively large quantities of hydrotropic substances are required to dissolve the casein without alkaline dissolving agents. It has been shown, however, that the impurities can be separated off in the present process also in the presence of alkaline substances. The latter at least considerably facilitate the solution of the casein and the amount of hydrotropic substances added can be considerably reduced.

Examples of alkaline dissolving agents are borax, sodium carbonate, trisodium phosphate, triethanolamine, ammonia and guanidine carbonate.

Organic solvents which are suitable for the process are, for example, benzine, petroleum ether, ligroin, lacquer benzine, ethyl ether, isopropyl alcohol, butyl alcohol, isobutyl alcohol, amyl alcohol, cyclohexanol, carbon tetrachloride, trichlor-ethylene, etc., without claiming this list to be completed. Particularly rapid and sharp separation of the layer containing the impurities is obtained by combination of various solvents, the only condition being that the specific gravity of the mixture, compared with that of the casein solution, favours separation of the emulsion.

The parts given in the following examples refer to parts by weight.

Example 1

20 parts of a technical acid precipitated casein are dissolved with 24 parts of sodium benzoate in 56 parts of water. In the turbid, viscous solution there is emulsified a mixture of 4 parts of isobutyl alcohol and 16 parts of ligroin. After a short time the separation of the emulsion becomes visible and is so far advanced after two days, that a lower layer of 80 parts of a clear, pure casein solution and an upper layer of 40 parts of a turbid mucilaginous mass can easily be separated.

Example 2

20 parts of casein are dissolved in a solution of 30 parts of sodium cymene sulphonate in 70 parts of water, 6 parts of butyl alcohol and 24 parts of benzine added, and the whole is shaken up until a uniform, turbid emulsion is formed. The latter separated within 24 hours in such a way that the lower brownish but transparent layer containing 100 parts of casein solution and the upper turbid layer contains the benzine in which the flocculent lactalbumin has collected, can be separated from each other.

Example 3

10 parts of casein are dissolved in a mixture of 30 parts of urea and 60 parts of water. After addition of 5 parts of amyl alcohol and 35 parts of petroleum ether, the whole is well shaken up. After a short time the emulsion begins to separate, an almost completely clear casein-urea solution being obtained as lower layer. All impurities causing the turbidity collect in the skim which forms on the upper layer. On dilution of the clear serum with water pure casein separates out.

Example 4

25 parts of casein, 3 parts of borax, 20 parts of urea and 5 parts of thiourea are dissolved in 47 parts of water. A cloudy mucilage is obtained which forms after some time a voluminous flocculent precipitate which is difficult to filter off. The latter cannot be made to settle by centrifuging. If, however, 6 parts of benzine and 6 parts of cyclohexanol are added to the fresh mucilage, the whole being well mixed in a rotating mixer and then allowed to stand, 85 parts of a clear transparent, yellowish solution separate off already after two days, containing about 24% of casein free from albumin. If the parent product contained for example 12% of foreign protein matter, the yield of pure casein is 93%. The casein is best isolated by diluting the separated, clear solution with four or five times its volume of water and precipitating the casein by adding dilute hydrochloric acid. All soluble impurities are removed by washing or dialysis. The casein obtained is free from albumin and is characterized by its special purity also in other respects.

Instead of urea and thiourea, corresponding quantities of formamide, acetamide, ammonium thiocyanate, etc. may be used alone or mixed together. The benzine may in addition be replaced by benzene, toluene, ethyl acetate, amyl acetate etc. The latter solvents, however, are less suitable, since they are too easily emulsified in casein solutions and require a longer time to form a skim.

Example 5

A mixture of 25 parts of casein, 20 parts of thiourea, 3 parts of trisodium phosphate and 52 parts of water are heated to 60° C. until a homogeneous solution is obtained. In this latter there are then emulsified 20 parts of butyl alcohol and 10 parts of lacquer benzine. The emulsion formed is allowed to form a skim at 60° C. and 65 parts of a clear, yellowish casein solution, containing thiourea, are obtained already after 12 hours. The solvents are recuperated from the upper, turbid layer in a known way, the lactalbumin being simultaneously obtained therefrom in the form of a horny mass.

Example 6

15 parts of isopropyl alcohol, 5 parts of trichlor-ethylene and 25 parts of benzine are added to a casein glue consisting of 20 parts of casein, 25 parts of urea, 5 parts of dicyandiamide and 1 part of ammonia of 25% strength. Two layers form after one or two days, of which the lower one contains casein free from albumen in addition to the other water-soluble ingredients and the upper one colloidal impurities and the part of the organic solvents which is insoluble in water.

Example 7

To 100 parts of a casein glue, obtained according to Example 5 (lines 1–2), are added 5 parts of butyl alcohol and 10 parts of carbon tetrachloride and by vigorous stirring as fine a distribution as possible of the solvent mixture is effected. After standing for two days, two sharply separated layers have formed, the upper one consisting of clear serum, the lower one of a turbid mixture of organic solvents with the separated mucilaginous components of the casein. The separation is preferably completed by centrifuging.

Example 8

A solution consisting of 20 parts of technical casein, 25 parts of ammonium thiocyanate, 2 parts of borax and 53 parts of water are mixed, by means of a rapid stirrer with 25 parts of trichlor-ethylene. The stirrer is then stopped and the mixture allowed to stand for several days. After this time two layers have formed, the upper one consisting of an almost clear, transparent casein solution, whereas the lower one is formed by the organic solvent and the flocculent impurities mixed therewith.

What I claim is:

1. A process for the purification of technical acid precipitated casein containing impurities such as lactalbumin, comprising emulsifying, in an aqueous solution of the technical acid precipitated casein which contains at least one hydrotropic substance which is hydrotropic with relation to protein, an organic liquid which is not completely miscible with water and whose specific gravity differs from the specific gravity of the casein solution and which is capable of forming a mucilaginous layer with the impurities, and allowing the emulsion to stand until the part of the organic liquid which is insoluble in water collects together with the impurities, in a mucilaginous layer sharply separated from the clear layer formed by the casein solution.

2. A process for the purification of technical acid precipitated casein containing impurities such as lactalbumin, comprising emulsifying, in an aqueous solution of the technical acid precipitated casein which contains at least one hydrotropic substance which is hydrotropic with relation to protein, a mixture of organic liquids which are not completely miscible with water and whose specific gravities collectively differ from the specific gravity of the casein solution and which are capable of forming a mucilaginous layer with the impurities, and allowing the emulsion to stand until the part of the organic liquid mixture which is insoluble in water collects together with the impurities, in a mucilaginous layer sharply separated from the clear layer formed by the casein solution.

3. Process according to claim 1 wherein the casein solution contains a substance of alkaline reaction.

4. Process according to claim 1 wherein the clear layer is separated from the mucilaginous layer by decantation.

5. Process according to claim 1 wherein the clear layer is separated from the mucilaginous layer by decantation, and the organic liquid is distilled off from the mucilaginous layer and reintroduced into the process.

6. A process for the purification of technical acid precipitated casein containing impurities such as lactalbumin comprising emulsifying benzine in an aqueous solution of the technical acid precipitated casein which contains urea as a hydrotropic substance, and allowing the emulsion to stand until a layer formation takes place.

7. A process for the purification of technical acid precipitated casein containing impurities such as lactalbumin comprising emulsifying benzine in an aqueous solution of the technical acid precipitated casein which contains thiourea as a hydrotropic substance, and allowing the emulsion to stand until a layer formation takes place.

8. A process for the purification of technical acid precipitated casein containing impurities such as lactalbumin comprising emulsifying butyl alcohol in an aqueous solution of the technical acid precipitated casein which contains thiourea as a hydrotropic substance, and allowing the emulsion to stand until a layer formation takes place.

LUZIUS SCHIBLER.